United States Patent
Garg et al.

(10) Patent No.: US 7,698,329 B2
(45) Date of Patent: Apr. 13, 2010

(54) METHOD FOR IMPROVING QUALITY OF SEARCH RESULTS BY AVOIDING INDEXING SECTIONS OF PAGES

(75) Inventors: Priyank S. Garg, San Jose, CA (US); Amit J. Basu, San Jose, CA (US); Timothy M. Converse, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 522 days.

(21) Appl. No.: 11/652,356

(22) Filed: Jan. 10, 2007

(65) Prior Publication Data
US 2008/0168053 A1    Jul. 10, 2008

(51) Int. Cl.
*G06F 17/20* (2006.01)
*G06F 15/16* (2006.01)
(52) U.S. Cl. ........................ 707/706; 707/709
(58) Field of Classification Search ............. 707/5
See application file for complete search history.

(56) References Cited

U.S. PATENT DOCUMENTS

2003/0120654 A1* 6/2003 Edlund et al. .................. 707/7
2005/0091580 A1* 4/2005 Kamholz et al. ............ 715/513

OTHER PUBLICATIONS

Matt Cutts; Handling noindex meta tags; Published Aug. 30, 2006; pp. 1-22.*

* cited by examiner

*Primary Examiner*—John E Breene
*Assistant Examiner*—Alex Gofman
(74) *Attorney, Agent, or Firm*—Hickman Palermo Truong & Becker LLP

(57) ABSTRACT

A method and apparatus for improving search results is provided. The method works by delineating sections of a document that are not relevant to the main content. The document content is subjected to ranking analysis in entirety. In response to a query results are recalled omitting terms included in the no-recall sections. Terms in the no-recall sections are not used in titles and abstracts of the results. The results are ordered at least in part by the rankings attributed to the identified no-recall sections.

14 Claims, 4 Drawing Sheets

```
200    <HTML>
201    <HEAD>
202    ...
203    </HEAD>
204    <BODY>
205        <TABLE>
206            <TR>
207                <TD> Title <.TD>
208            </TR>
209            <TR>
210                <TD>
211                    <TABLE>
212                        <TR>
213                            <div class="robots-noindex" >
214                            <TD> Navigation </TD>
215                            </div class="robots-noindex" >
216                        </TR>
217                        <TR>
218                            <TD> Main Content </TD>
219                        </TR>
220                        <TR>
221                            <div class="robots-noindex" >
222                            <TD> Related Blogs, Ads</TD>
223                            </div class="robots-noindex" >
224                        </TR>
225                    </TABLE>
226                </TD>
227            </TR>
228            <TR>
229                <div class="robots-noindex" >
230                <TD> Copyright </TD>
231                </div class="robots-noindex" >
232            </TR>
233        </TABLE>
234    </BODY>
235    </HTML>
```

Figure 2.

METHOD FOR IMPROVING QUALITY OF SEARCH RESULTS BY AVOIDING INDEXING SECTIONS OF PAGES

FIELD OF THE INVENTION

The present invention relates to improving relevance of results provided by a search engine.

BACKGROUND OF THE INVENTION

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A search engine is a combination of integrated software components (including data) and an allocation of computational resources, such as memory, a node, and processes on a computer or multiple computers for executing the integrated software components, where the combination of the software and computational resources are dedicated to searching a set of information resources. Search engines generate search results for queries submitted to the search engine. Search engines are widely used on the Internet, the World Wide Web (www, Web, WWW, etc.) and other large internetworks and information resource webs. Often, search engines are publicly accessible as web sites, such as those made available by Yahoo™ and Google™ web pages, which are respectively accessible with the links (http://search.yahoo.com/) and (http://www.google.com/).

The information resources searched by search engines are referred to herein as documents. A document is any unit of information that may be indexed by search engine indexes, which are described below. Often a document is a file which may contain plain or formatted text, inline graphics, and other multimedia data, and hyperlinks to other documents. A document may conform to XML (Extensible Mark-up Language, as promulgated by the World Wide Web Consortium), HTML (Hypertext Markup Language), or other public or private standard (e.g. PDF, Portable Document Format by Adobe™, MS Word by Microsoft™). Documents may be static or dynamically generated.

Search engines use a search engine index (or more than one index), also referred to herein simply as an index, to search for documents. Search engine indexes can be directories, in which content is indexed more or less manually, to reflect human observation. More typically, search engine indexes are created and maintained automatically by processes referred to herein as crawlers. Crawlers explore information over the Internet, essentially continuously, looking for as many documents as they may find at locations to which the crawlers are configured to search. Crawlers may follow links from one document to another, index their content (e.g., semantically, conceptually, etc.) in a search index and summarize them in databases, typically of significant size. It is these indexes and databases that are actually searched in response to a search query.

The search result generated by a search engine comprises a list of documents and may contain summary information about the document. The list of documents may be ordered. To order a list of documents, a search engine may assign a rank to each document in the list. When the list is sorted by rank, a document with a relatively higher rank may be placed closer to the head of the list than a document with a relatively lower rank. A search engine may rank the documents according to relevance to the search query. Relevance is a measure of how closely the subject matter of a document matches a search query's terms. The inclusion of a document within the search engine results generated by a search engine for a search engine query is referred to herein as document recall.

Various nefarious techniques, referred to as search engine spamming, are used to trick search engines into recalling documents and inflating their rank. The techniques generally trick search engine ranking algorithms into recalling and highly ranking documents that contain, for example, sponsored links to a web merchant. The higher ranking increases exposure of such documents to search engine users and can ultimately lead to more revenue for search engine spammers. As a result, some of the most highly ranked results for search engine queries are documents with content that is very irrelevant to the queries and desires of search engine users. Such results are referred to herein as search engine spam.

A typical example of search engine spam is when a user tries to search for the terms "digital camera reviews" and expects to find pages which review various models of digital cameras, detailing performance specifications, sample images and reviewer pros and cons list. Having this expectation when the user clicks on a link for one of the results, the user is instead led to a page that contains nothing but a plethora of keywords and links to other stores where he can buy the camera. This trickery translates to poor user experience and leads to an adverse judgment of search engine performance. Many webmasters may legitimately wish that some content of a page not be indexed by search engines because the content has no relation to the intended focus of the page. A solution that could address this need is to allow a webmaster to designate what sections of the page should not be indexed. However, this opens the door to nefarious techniques for hiding search engine spam. Clearly, there is need for mechanisms that prevent hiding of search engine spam but yet allow webmasters to designate page content that should not be indexed.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is HTML layout of a web page with portions that are not indexed, according to an embodiment of the present invention.

DETAILED DESCRIPTION OF THE INVENTION

A method and apparatus for improving quality of search results is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Mechanisms are provided that allow search engines to affect the recall and ranking of documents to more accurately reflect relevance of the documents to search engine queries. The mechanisms can be implemented, using crawlers that create search engine indexes of documents, their content (e.g., semantically, conceptually, etc.) and summaries of the documents. As a crawler examines an individual document, one of the attributes that can be considered is section structure. In examining the various sections, the crawler identifies sections to ignore, that is, to not index in search engine indexes and or otherwise use for recalling the document. Such sections are referred to herein as "no-recall sections." Those portions that are indexed for recalling are referred to as recall sections. In an embodiment, a crawler ignores no-recall sections demarcated by, for example, a tag. In another embodiment a no-recall section may be identified by analyzing section content rather than examining only delimiters. The terms inside no-recall sections do not contribute to the document term frequency counts and are not used for recalling the documents in response to search engine queries. However the no-recall sections are included as input to forms of analysis of the document that affect, for example, the document's ranking. Links inside the no-recall sections as well as the rest of the document may be followed in order to discover new content. The document may be analyzed for the amount of advertisements or other features in its entirety. Therefore, terms inside the no-recall sections can affect document ranking. Such analysis prevents hiding of search engine spam. A page containing copious amounts of advertisements, or low quality links will be readily identified and ranked accordingly.

Figure 1:
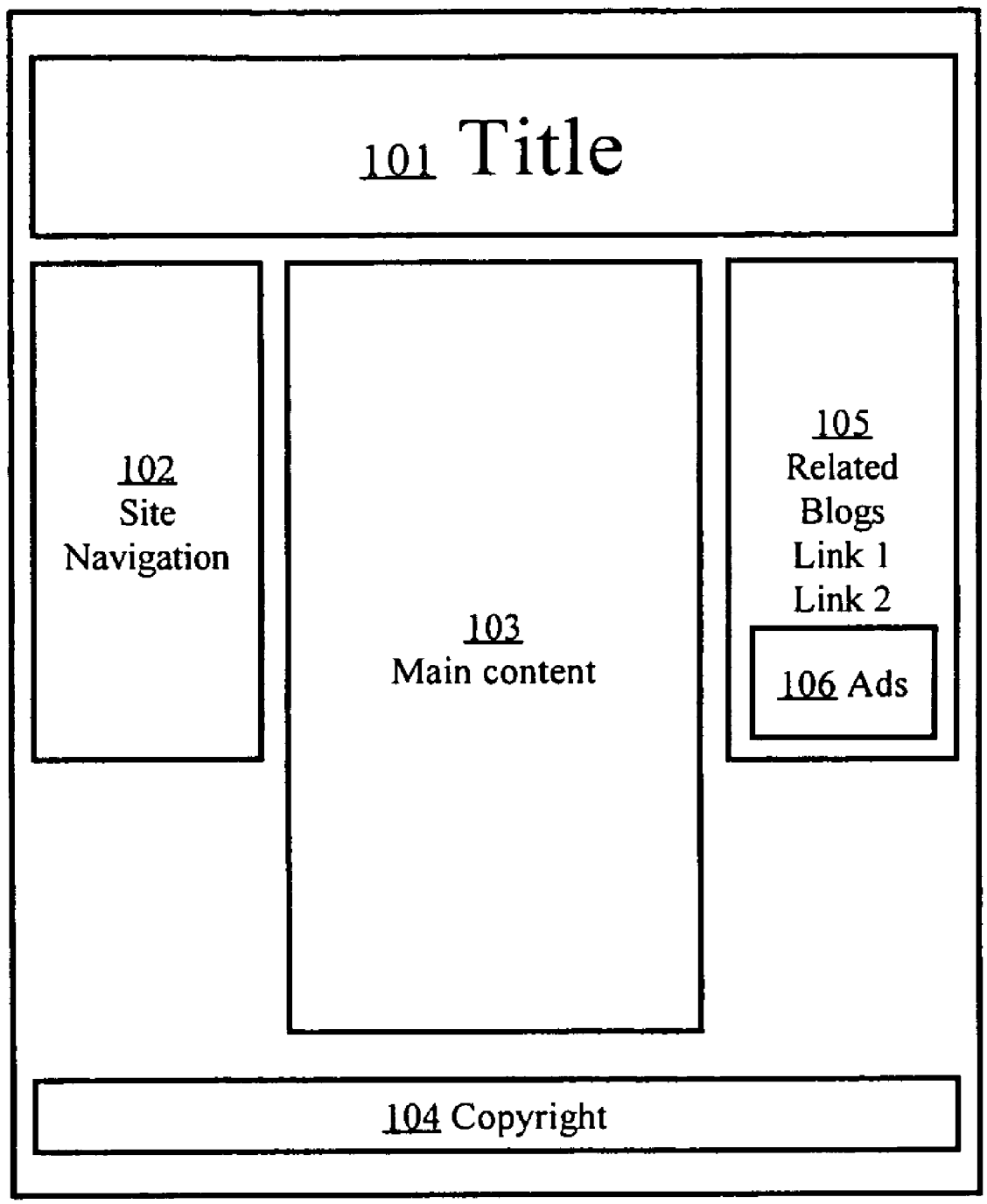
FIG. 1 is an example layout of a web page, according to an embodiment of the present invention.

An embodiment of the invention is illustrated in a context of a web page 100 shown in FIG. 1. Web page 100 contains a title 101, a navigation pane section 102, main content section 103, copyright notice 104, and a section with a constantly changing text (or other content) of related blogs 105 and ad section 106. The elements, navigation pane section 102, copyright notice 104, related blogs 105, and ad section 106 are not related to the main content of the page.

The layout and basic structure of a web page presented in FIG. 1 could have an HTML code implementation structure as illustrated in FIG. 2. The HTML code of Web page 100 can be statically or dynamically generated. The <HTML> tags, lines 200 and 235 specify the version of HTML used in the document. The <BODY> tags lines 204 and 234 enclose the document's content. The positioning of elements in the Web page is achieved by nested tables; lines 205, 233 and 211, 225. Information in tables is presented in rows <TR> and table data elements <TD>.

A <div class="robots-noindex"> tag is used to delimit the no-recall sections of web page 101. The tag delimits the copyright notice 104 lines 229, 231, navigation pane section 102 lines 213, 215, related blogs 105 and ad section 106 lines 221, 223. Functionally, the <div class="robots-noindex"> tag causes content contained therein to be ignored for purposes of recalling the document. For example, if inside the ad section 106 there is a term "shoes", and the term "shoes" does not appear anywhere else in the page, the page will not be recalled for a search engine query for the word "shoes". Of course, if the word "shoes" is included in other portions of the page, the page will be recalled for the query. The <div class="robots-noindex"> tag as introduced works at a granular level, with the ability to create no-recall sections of a document. It should be noted that the actual name of the tag <div class="robots-noindex"> is for illustration; any tag name can aptly serve the same purpose.

While ignoring no-recall sections prevents recall of documents under appropriate circumstances, completely ignoring them could create exploitable loopholes. For example, a document may be designed so that content that increases recall and/or ranking potential is placed in the recall section and content that diminishes high ranking potential is hidden in a no-recall section. To prevent such exploitation, no-recall sections are not ignored when ranking documents recalled by a search engine for a search engine query. For example, a <div class="robots-noindex"> element of a document is not indexed by a search engine index, but when the document is recalled by a search engine for a search engine query, the element is considered for spam and relevancy analysis. All the attributes in all of the sections of a document such as "links", frequency of terms, coloring, font, etc. are therefore considered for spam and relevancy analysis.

Figure 3:
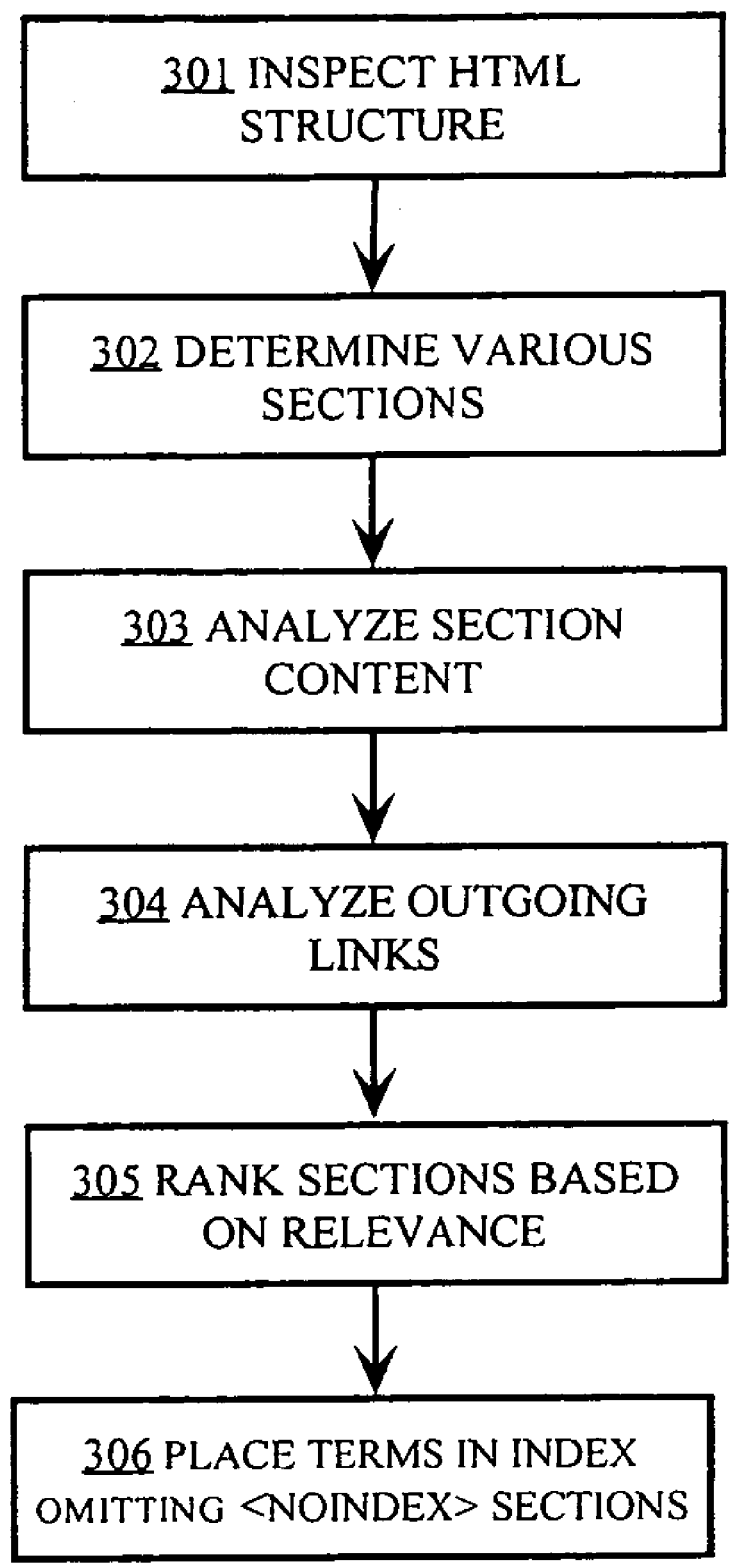
FIG. 3 is a flow diagram that illustrates a process of improving the quality of a web page by delineating no-recall portions, according to an embodiment of the presenting invention.

FIG. 3 is a flow diagram of a procedure for determining whether a section of a document is a no-recall section according to an embodiment of the present invention. Referring to FIG. 3, at step 301, the HTML code of a document is parsed to determine various logical sections in step 302. In step 303, the content of each section is subjected to analysis. The analysis consists of creating an abstract document model using one of, or a combination of set theoretic, algebraic or probabilistic approaches. In the analysis, various attributes are determined such as the number, frequency and order of appearance of terms, fonts, and colors. Outgoing links in each section are analyzed; some link characteristics considered are where the links lead, the link text and link quantity and quality. In step 305 sections are rated based on their relevance to the main topic of the page. Section rating scores can be determined from the document model. In an algebraic approach, terms inside a section or document can be represented by multidimensional vectors having direction and magnitude, the relevancy can be ascertained by the magnitude of vector deviations. Standard or extended Boolean model can also be used. In a probabilistic approach, a natural language model of a document can be used. In a natural language model probability of a sequence of terms appearing in a given document or a specific section is determined. Rating is computed for a target sequence of terms by determining a conditional probability for the sequence of terms given the computed natural language model of a document. Other attributes of a section may also be used to identify a no-recall section. These include the frequency of change of a section in comparison to the rest of the page. For example an ad section might change for each visit to a page, while the rest of the page may not, or the repeated occurrence of a section across all pages of a site a copyright/title section of a page may occur identically on all pages of a site. Finally, in step 306, sections having a rating that indicates that the sections are no-recall sections are designated and treated as no-recall sections, as well sections demarcated by <div class="robots-noindex"> tag.

Search results returned by a search engine for a query contain short descriptive paragraphs or abstracts for a recalled document. Abstracts provide a concise description of the respective document. According to an embodiment, the contents of no-recall sections are excluded from the abstract. This meets the expectations of users in that if a term is not used to recall a document, the term should not show up in an abstract.

Hardware Overview

Figure 4:
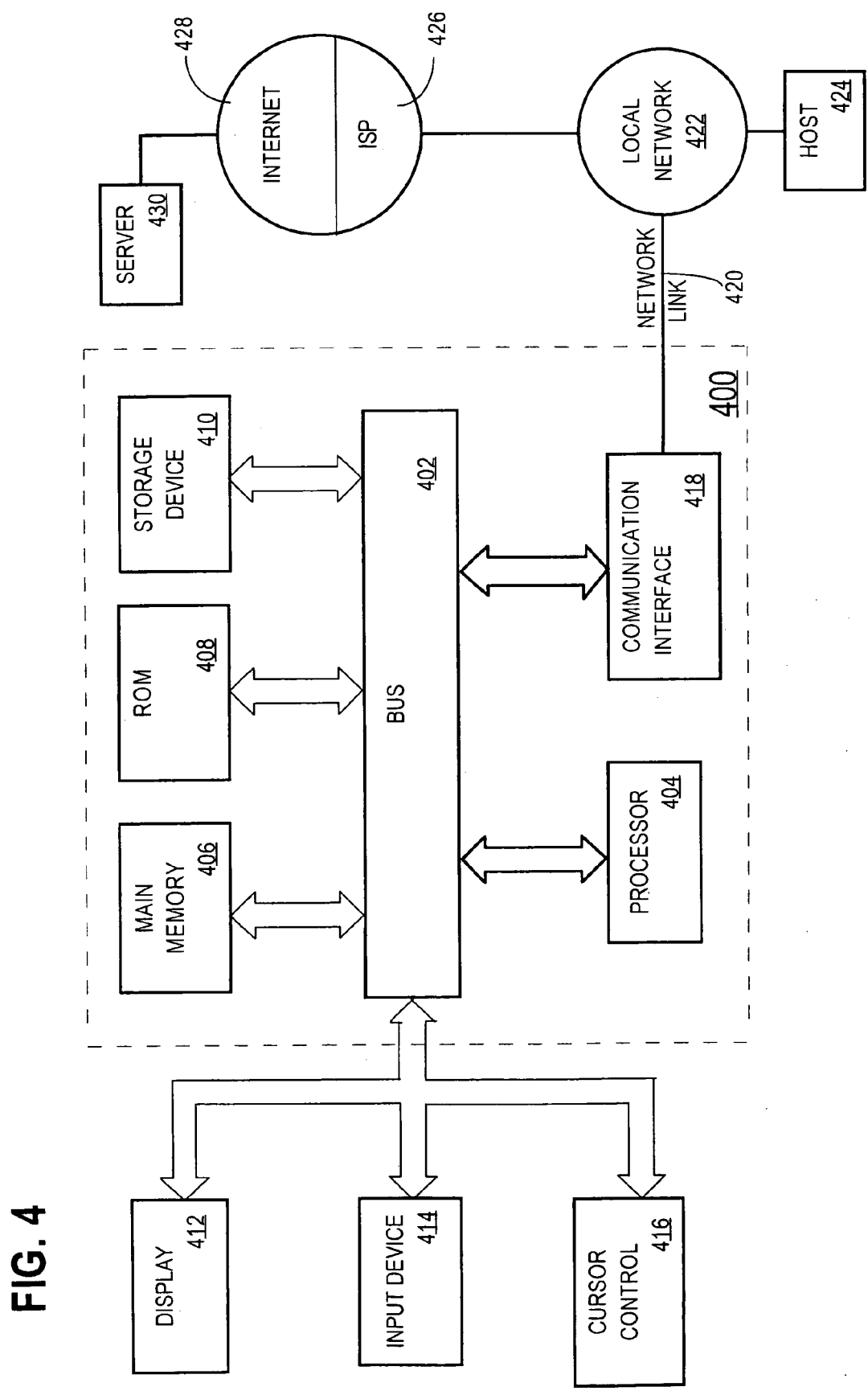
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
ranking a plurality of documents recalled by a search engine for a query;
wherein the plurality of documents contain certain documents, each document of said certain documents containing at least one section that is not used by said search engine for recall and one or more sections that are used by said search engine for recall;
wherein ranking a plurality of documents includes ranking said plurality of documents based, at least in part, on the at least one section of said certain documents not used by said search engine to recall documents; and
wherein the method is performed by one or more computing devices.

2. The method of claim 1, wherein said at least one section of said certain documents not used by said search engine to recall documents are demarcated by a tag of an element having a name from a set of one or more names.

3. The method of claim 1, wherein at least one document of said certain documents does not comprise data that contains element tags.

4. The method of claim 1, further including said search engine generating data representing results of said query, wherein:
said data includes an abstract describing each document of said plurality of documents; and
for each respective abstract of each document of said certain documents, said abstract excludes terms from the respective at least one section not used by said search engine to recall said each document.

5. The method of claim 1, said search engine using a search engine index to recall said plurality of documents; and wherein said search engine index does not index any term in said certain documents that is found only in one or more sections of said certain documents established as a no-recall section.

6. The method of claim 1, wherein ranking a plurality of documents recalled by a search engine for a query depends in part on a vector space model associated with each of said documents.

7. The method of claim 1, wherein ranking a plurality of documents recalled by a search engine for a query depends in part on a language model associated with each of said documents.

8. A computer-readable storage medium that stores instructions which, when executed by one or more processors, cause performance of:
ranking a plurality of documents recalled by a search engine for a query;
wherein the plurality of documents contain certain documents, each document of said certain documents containing at least one section that is not used by said search engine for recall and one or more sections that are used by said search engine for recall; and
wherein ranking a plurality of documents includes ranking said plurality of documents based, at least in part, on the at least one section of said certain documents not used by said search engine to recall documents.

9. The computer-readable storage medium of claim 8 wherein said at least one section of said certain documents not used by said search engine to recall documents are demarcated by a tag of an element having a name from a set of one or more names.

10. The computer-readable storage medium of claim 8 wherein at least one document of said certain documents does not comprise data that contains element tags.

11. The computer-readable storage medium of claim 8 further comprising instructions for including said search engine generating data representing results of said query, wherein:
said data includes an abstract describing each document of said plurality of documents; and
for each respective abstract of each document of said certain documents, said abstract excludes terms from the respective at least one section not used by said search engine to recall said each document.

12. The computer-readable storage medium of claim 8, said search engine using a search engine index to recall said plurality of documents; and wherein said search engine index does not index any term in said certain documents that is found only in one or more sections of said certain documents established as a no-recall section.

13. The computer-readable storage medium of claim 8, wherein ranking a plurality of documents recalled by a search engine for a query depends in part on a vector space model associated with each of said documents.

14. The computer-readable storage medium of claim 8, wherein ranking a plurality of documents recalled by a search engine for a query depends in part on a language model associated with each of said documents.

* * * * *